US012436700B2

(12) United States Patent
Cohen et al.

(10) Patent No.: US 12,436,700 B2
(45) Date of Patent: *Oct. 7, 2025

(54) PERFORMANCE OF DISPERSED LOCATION-BASED DEDUPLICATION

(71) Applicant: International Business Machines Corporation, Armonk, NY (US)

(72) Inventors: Reut Cohen, Tel Aviv (IL); Jonathan Fischer-Toubol, Tel Aviv (IL); Afief Halumi, Tel Aviv (IL); Danny Harnik, Tel Mond (IL); Ety Khaitzin, Petah Tikva (IL); Sergey Marenkov, Tel Aviv (IL); Asaf Porat-Stoler, Ramat Gan (IL); Yosef Shatsky, Karnei Shomron (IL); Tom Sivan, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 268 days.

This patent is subject to a terminal disclaimer.

(21) Appl. No.: 17/590,367

(22) Filed: Feb. 1, 2022

(65) Prior Publication Data

US 2022/0155987 A1 May 19, 2022

Related U.S. Application Data

(63) Continuation of application No. 15/793,109, filed on Oct. 25, 2017, now Pat. No. 11,269,531.

(51) Int. Cl.
*G06F 3/06* (2006.01)
*G06F 11/14* (2006.01)
(Continued)

(52) U.S. Cl.
CPC .......... *G06F 3/0641* (2013.01); *G06F 3/0673* (2013.01); *G06F 11/1453* (2013.01);
(Continued)

(58) Field of Classification Search
CPC ............... G06F 3/0641; G06F 16/1752; G06F 16/1748; G06F 3/0673; G06F 11/1453;
(Continued)

(56) References Cited

U.S. PATENT DOCUMENTS 7,567,188 B1    7/2009   Anglin et al.
8,332,612 B1    12/2012  Raizen et al.
(Continued)

FOREIGN PATENT DOCUMENTS

CN    101706825 A    5/2010
CN    101710323 A    5/2010
(Continued)

OTHER PUBLICATIONS

Mao et al. Read-Performance Optimization for Deduplication-based Storage Systems in the Cloud ACM Transactions on Storage, vol. 10, No. 2, Article 6, Publication date: Mar. 2014 (Year: 2014).*
(Continued)

*Primary Examiner* — Ajay M Bhatia
*Assistant Examiner* — Berhanu Mitiku
(74) *Attorney, Agent, or Firm* — CHIP LAW GROUP

(57) ABSTRACT

A mechanism is provided for dispersed location-based data storage. A request is received to write a data file to a referrer memory region in a set of memory regions. For each data chunk of the data file, responsive to a comparison of a hash value for the data chunk to other hash values for other stored data chunks referenced in the referrer memory region indicating that the data chunk fails to exist in the referrer memory region, responsive to the data chunk existing in another memory region in the set of memory regions, responsive to the memory region failing to be one of the predetermined number N of owner memory regions associated with the referrer memory region, and responsive to the predetermined number N of owner memory regions failing
(Continued)

to have been met, a reference to the data chunk is stored in the referrer memory region.

20 Claims, 5 Drawing Sheets

(51) Int. Cl.
  *G06F 16/174* (2019.01)
  *G06F 16/2455* (2019.01)
(52) U.S. Cl.
  CPC ...... *G06F 16/1748* (2019.01); *G06F 16/1752* (2019.01); *G06F 16/24556* (2019.01)
(58) Field of Classification Search
  CPC ............. G06F 16/24556; G06F 16/182; G06F 16/278; G06F 16/2322; G06F 16/2365; G06F 16/2379; G06F 16/27; G06F 16/275; G06F 3/0608; G06F 16/9574; G06F 3/0653; G06F 3/0631
  See application file for complete search history.

(56) References Cited

U.S. PATENT DOCUMENTS

| | | | |
|---|---|---|---|
| 9,208,167 | B1 | 12/2015 | Henderson |
| 9,244,967 | B2 | 1/2016 | Provenzano et al. |
| 9,329,987 | B1* | 5/2016 | Zhu ..................... G06F 11/3037 |
| 9,563,683 | B2 | 2/2017 | Abercrombie et al. |
| 9,965,182 | B2 | 5/2018 | Harnik et al. |
| 2009/0234795 | A1 | 9/2009 | Haas et al. |
| 2009/0249014 | A1* | 10/2009 | Obereiner ........... G06F 12/1441 |
| | | | 711/163 |
| 2010/0077013 | A1 | 3/2010 | Clements et al. |
| 2010/0223441 | A1* | 9/2010 | Lillibridge ............ G06F 3/0646 |
| | | | 711/170 |
| 2011/0218967 | A1 | 9/2011 | Sliger et al. |
| 2012/0084268 | A1 | 4/2012 | Vijayan et al. |
| 2012/0084269 | A1 | 4/2012 | Vijayan et al. |
| 2013/0159620 | A1* | 6/2013 | Sakashita ................ G06F 3/061 |
| | | | 711/E12.019 |
| 2014/0019677 | A1* | 1/2014 | Chang ................ G06F 12/0804 |
| | | | 711/143 |
| 2014/0237202 | A1 | 8/2014 | Yamamoto et al. |
| 2015/0074065 | A1 | 3/2015 | Christ et al. |
| 2015/0134672 | A1 | 5/2015 | Ren et al. |
| 2015/0142739 | A1 | 5/2015 | Mutalik et al. |
| 2017/0116229 | A1 | 4/2017 | Harnik et al. |
| 2017/0161329 | A1* | 6/2017 | Chambliss .......... G06F 16/1748 |
| 2017/0286002 | A1* | 10/2017 | Amit ..................... G06F 3/0608 |
| 2017/0364414 | A1* | 12/2017 | Pogosyan ........... G06F 16/9027 |
| 2018/0232140 | A1 | 8/2018 | Harnik et al. |
| 2018/0232172 | A1 | 8/2018 | Amit et al. |
| 2019/0121563 | A1 | 4/2019 | Cohen et al. |

FOREIGN PATENT DOCUMENTS

| | | |
|---|---|---|
| CN | 111213130 A | 5/2020 |
| DE | 112018004402 B4 | 11/2022 |
| GB | 2580276 A | 7/2020 |
| JP | 2011159142 A | 8/2011 |
| JP | 2014160311 A | 9/2014 |
| JP | 2014527672 A | 10/2014 |
| JP | 2017526084 A | 9/2017 |
| JP | 2021-500643 A | 1/2021 |
| WO | 2013/025864 A1 | 2/2013 |
| WO | 2019/082016 A1 | 5/2019 |

OTHER PUBLICATIONS

Lim et al. An Efficient NAND Flash File System for Flash Memory Storage IEEE Transactions on Computers, vol. 55, No. 7, Jul. 2006 (Year: 2006).*
List of IBM Patents or Patent Applications Treated as Related, Jan. 28, 2022, 2 pages.
Anonymously, "A method for reducing information leakage via cross-user de-duplication mechanisms", ip.com; IPCOM000199656D, Sep. 14, 2010, 3 pages.
Anonymously, "Method and System for Managing Multi-tenancy Over De-duplication Technology for a Storage Cloud", ip.com; IPCOM/000210397D, Sep. 2, 2011, 4 pages.
Anonymously, "Method and System for Reducing Storage Consumption using Virtual Storage Blocks and Block-Level Virtualization and De-duplication", ip.com; IPCOM/000194381D, Mar. 22, 2010, 4 pages.
Anonymously, "Method to de-duplicate local files with a distributed environment", ip.com; IPCOM/000233580D, Dec. 16, 2013, 7 pages.

* cited by examiner

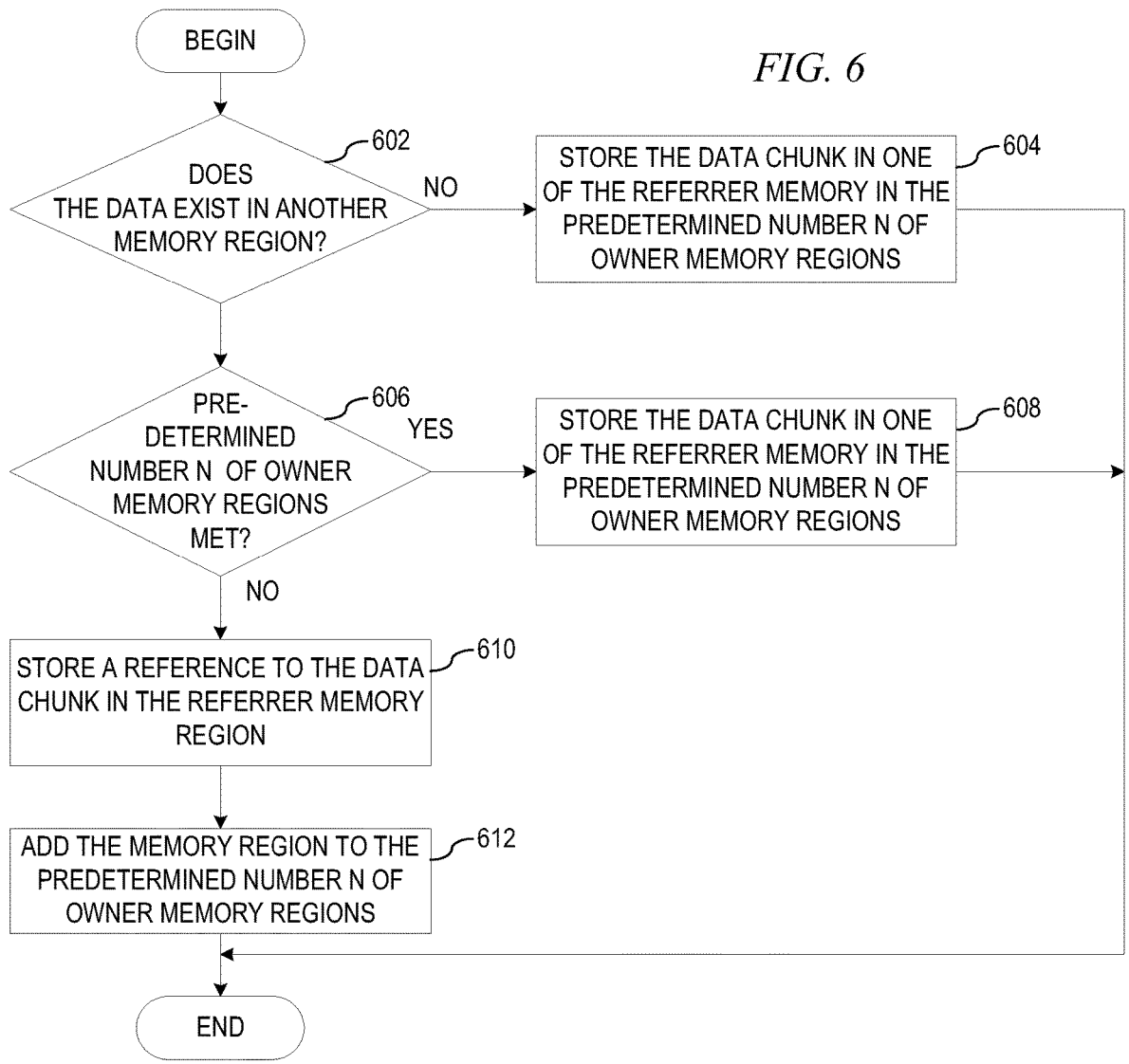

PERFORMANCE OF DISPERSED LOCATION-BASED DEDUPLICATION

BACKGROUND

The present application relates generally to an improved data processing apparatus and method and more specifically to mechanisms for improving the performance of dispersed location-based deduplication.

In storage systems, deduplication is a process of replacing duplicate data across the system with pointers, references, or the like, to a single instance of the data, and hence reducing the overall storage requirement. Typically, a deduplication reference is a metadata entry pointing to an owner which is either the data itself or metadata representing the data. There are two primary schemes for storing the data: content-based deduplication and location-based deduplication. In content-based deduplication, data placed within the storage is determined by the data's fingerprint, hash value, or the like. In location-based deduplication, data placed within the storage is determined by the data's user-space location (volume-offset).

One key advantage of location-based deduplication is locality of the data when performing large reads or sequential reads. Location-based deduplication requires fewer disk inputs/outputs (I/Os). On the other hand, content-based deduplication has better balancing of resources when there are few I/Os in the system. Since deduplication requires a substantial amount of random access memory (RAM), some implementations divide the metadata into regions (division of space) for simplification of management and/or swapping, such as an owner region and a referrer region.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for dispersed location-based data storage. The illustrative embodiment receives a request, from a host system, to write a data file to a referrer memory region in a set of memory regions. For each data chunk of the data file: the illustrative embodiment determines whether the data exists is in another memory region in the set of memory regions in response to a comparison of a hash value for the data chunk to other hash values for other stored data chunks referenced in the referrer memory region indicating that the data chunk fails to exist in the referrer memory region. The illustrative embodiment determines whether the memory region is one of a predetermined number N of owner memory regions associated with the referrer memory region in response to the data chunk existing in another memory region in the set of memory regions. The illustrative embodiment determines whether the number of owner memory regions in the predetermined number N of owner memory regions has been met in response to the memory region failing to be one of the predetermined number N of owner memory regions associated with the referrer memory region. The illustrative embodiment stores a reference to the data chunk in the referrer memory region in response to the predetermined number N of owner memory regions failing to have been met.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 6 depicts a flow diagram of the operations performed by a storage mechanism if deduplication is to be enforced amongst a subset of memory regions, i.e. the referrer memory regions and the associated one or more owner memory regions in accordance with an illustrative embodiment.

DETAILED DESCRIPTION

As mentioned previously, there are two primary schemes for storing the data: content-based deduplication and location-based deduplication. In content-based deduplication, data placed within the storage is determined by the data's fingerprint, hash value, or the like. In location-based deduplication, data placed within the storage is determined by the data's user-space location (volume-offset). Utilizing location-based deduplication in a system based on metadata region as one example, any advantage of locality may suffer when there is a numerous deduplication for which the data (or owning metadata) is dispersed over the entire storage.

Figure 1:
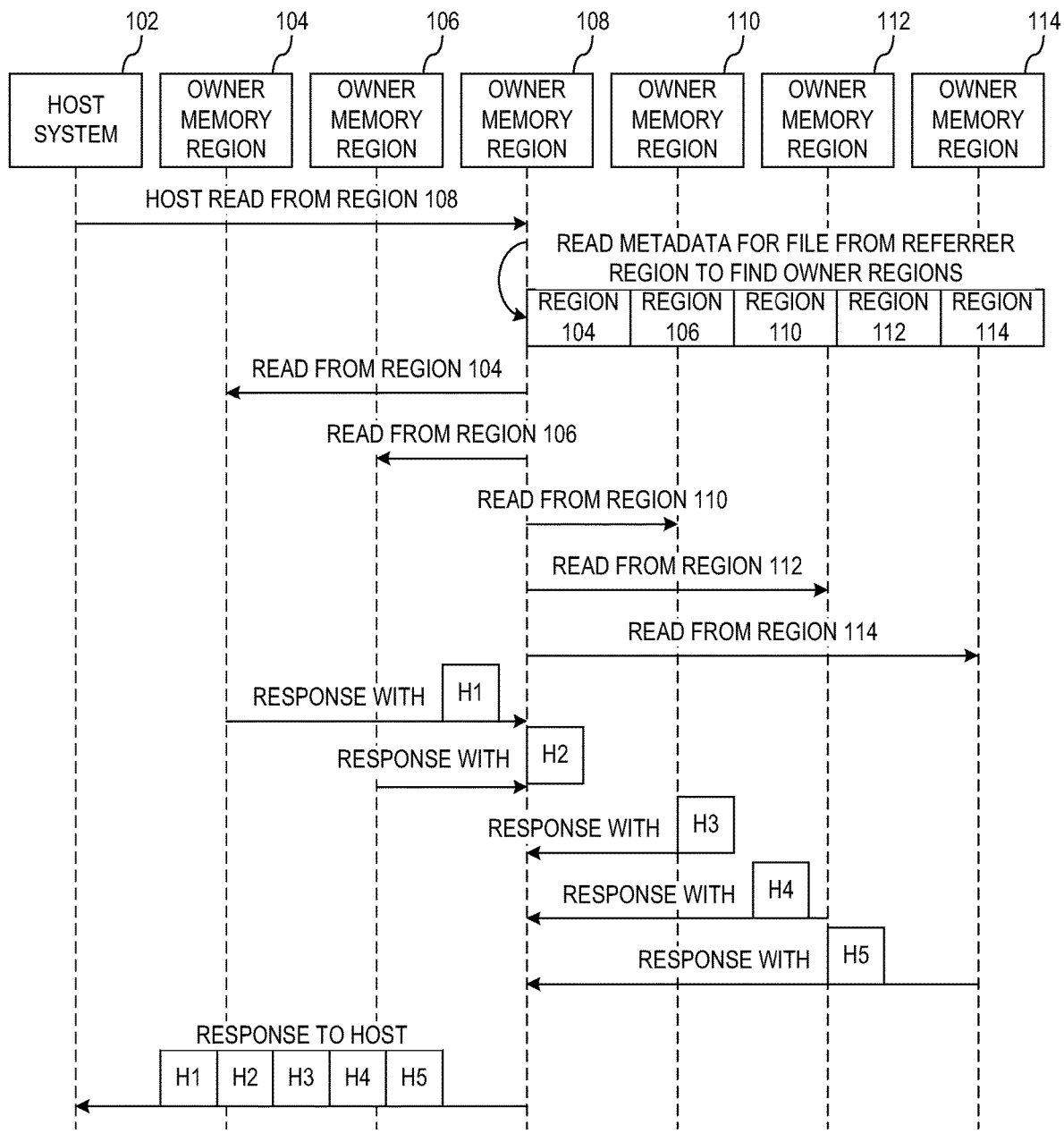
FIG. 1 depicts writing a 40 KB file as five 8 KB chunks in eight different owner regions leading to many types of overhead in accordance with an illustrative embodiment.

For example, when a 64 KB file is stored as eight 8 KB chunks, a read of the 64 KB file may require accessing eight different owner regions, which may lead to many types of overhead as is illustrated in FIG. 1 in accordance with an illustrative embodiment.

That is, as is shown in FIG. 1, host system 102 performs a read for a file from memory region 108. At memory region 108, metadata associated with the file is read and five different owner memory regions are identified as comprising at least a portion of the file, memory regions 104, 106, 110, 112, and 114. Thus, memory region 108 performs a read for the portion of the file resident on memory region 104, memory region 108 performs a read for the portion of the file resident on memory region 106, memory region 108 performs a read for the portion of the file resident on memory region 110, memory region 108 performs a read for the portion of the file resident on memory region 112, and memory region 108 performs a read for the portion of the file resident on memory region 114. Based on those reads, memory region 108 receives a response H1 for the portion of the file resident on memory region 104 from memory region 104, memory region 108 receives a response H2 for the portion of the file resident on memory region 106 from memory region 106, memory region 108 receives a response H3 for the portion of the file resident on memory region 110 from memory region 110, memory region 108 receives a response H4 for the portion of the file resident on memory region 112 from memory region 112, and memory region 108 receives a response H5 for the portion of the file resident on memory region 114 from memory region 114. Upon receiving the responses, H1, H2, H3, H4, and H5, memory region 108 responds to host system 102 with a response that includes H1, H2, H3, H4, and H5. Therefore, due to the storage of the chunks of the file across five different owner memory regions, one read to one memory region (memory region 108) included more reads from other owner memory regions, more communication between cluster memory regions, and swapping in of metadata between memory regions when not all metadata is contained in the originally read memory region. This overhead with reach of these additional reads leads to a severe performance degradation of the system.

Accordingly, the illustrative embodiments provide mechanisms for improving performance of dispersed location-based deduplication with minimal impact on deduplication efficiency. The illustrative embodiments intelligently create duplication links between different referrer and owner memory regions by applying dynamic management logic on owner memory region selection within referrer memory region. This is accomplished by two fundamental mechanisms. The first mechanism limits a number of owner memory regions that may be linked to a given referrer (up to a predetermined number N owner memory regions) in one of the following ways:

- Utilizing a "first come, first served" policy that allows data to be stored on the predetermined number N owner memory regions.
- Utilizing a "popularity" policy that allows data to be stored based on a popularity of owner memory region in the referrer memory region.
  - The popularity of an owner memory region may be determined within a single write.
  - The popularity of an owner memory region may be determined across multiple writes.
- Utilizing a hybrid policy that allows data to initially be stored in a "first come, first served" to be stored on a second predetermined number M owner memory regions with M<N, then allow data to be stored based on a popularity of owner memory region in the referrer memory region only up to the predetermined number N owner memory regions.

The second mechanism replaces a less popular owner memory region by a more popular owner memory region, such that a less popular owner memory region is decommissioned as a preferred owner memory region when a more beneficial owner memory region is identified.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
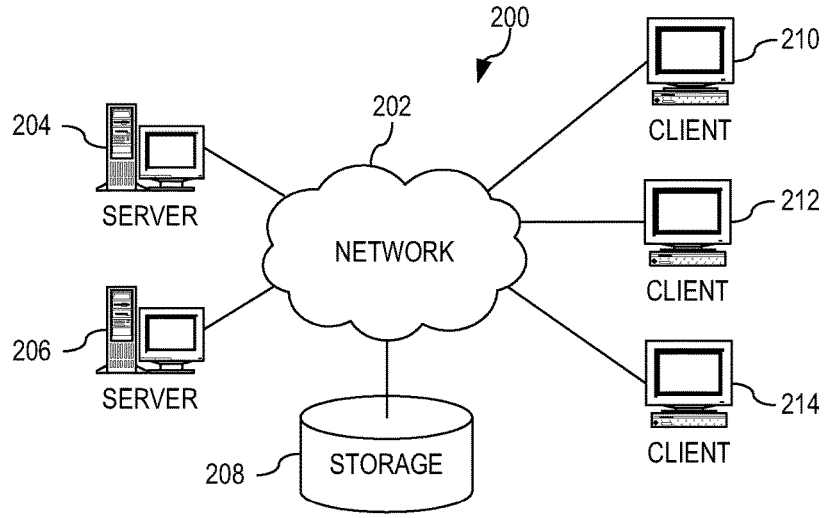
FIG. 2 is an example diagram of a distributed data processing system in which aspects of the illustrative embodiments may be implemented.
Figure 3:
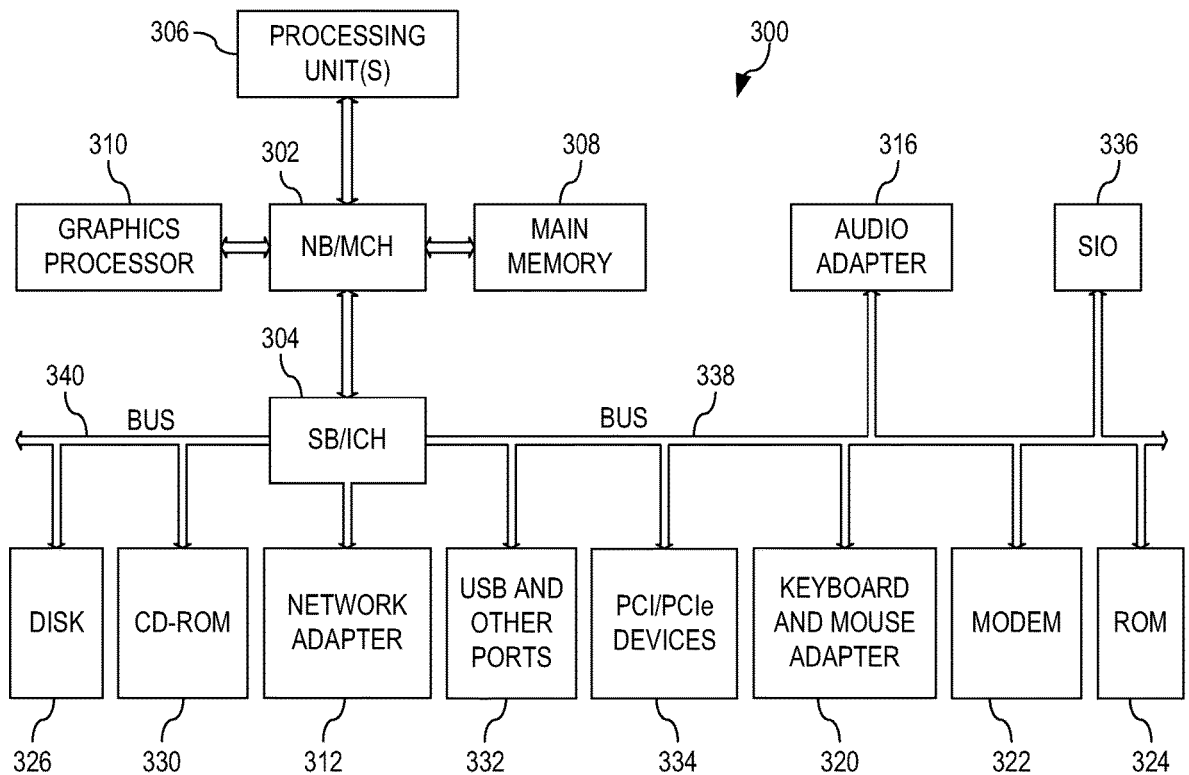
FIG. 3 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 2 and 3 are provided hereafter as example environments in which aspects of the illustrative embodiments may be implemented. It should be appreciated that FIGS. 2 and 3 are only examples and are not intended to assert or imply any limitation with regard to the environments in which aspects or embodiments of the present invention may be implemented. Many modifications to the depicted environments may be made without departing from the spirit and scope of the present invention.

FIG. 2 depicts a pictorial representation of an example distributed data processing system in which aspects of the illustrative embodiments may be implemented. Distributed data processing system 200 may include a network of computers in which aspects of the illustrative embodiments may be implemented. The distributed data processing system 200 contains at least one network 202, which is the medium used to provide communication links between various devices and computers connected together within distributed data processing system 200. The network 202 may include connections, such as wire, wireless communication links, or fiber optic cables.

In the depicted example, server 204 and server 206 are connected to network 202 along with storage unit 208. In addition, clients 210, 212, and 214 are also connected to network 202. These clients 210, 212, and 214 may be, for example, personal computers, network computers, or the like. In the depicted example, server 204 provides data, such as boot files, operating system images, and applications to the clients 210, 212, and 214. Clients 210, 212, and 214 are clients to server 204 in the depicted example. Distributed data processing system 200 may include additional servers, clients, and other devices not shown.

In the depicted example, distributed data processing system 200 is the Internet with network 202 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 200 may also be implemented to include a number of different types of networks, such as for example, an intranet, a local area network (LAN), a wide area network (WAN), or the like. As stated above, FIG. 2 is intended as an example, not as an architectural limitation for different embodiments of the present invention, and therefore, the particular elements shown in FIG. 2 should not be considered limiting with regard to the environments in which the illustrative embodiments of the present invention may be implemented.

As shown in FIG. 2, one or more of the computing devices, e.g., server 204, may be specifically configured to implement a mechanism for improving performance of dispersed location-based deduplication with minimal impact on deduplication efficiency. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 204, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improving performance of dispersed location-based deduplication with minimal impact on deduplication efficiency.

As noted above, the mechanisms of the illustrative embodiments utilize specifically configured computing devices, or data processing systems, to perform the operations for improving performance of dispersed location-based deduplication with minimal impact on deduplication efficiency. These computing devices, or data processing systems, may comprise various hardware elements which are specifically configured, either through hardware configuration, software configuration, or a combination of hardware and software configuration, to implement one or more of the systems/subsystems described herein. FIG. 3 is a block diagram of just one example data processing system in which aspects of the illustrative embodiments may be implemented. Data processing system 300 is an example of a computer, such as server 204 in FIG. 2, in which computer usable code or instructions implementing the processes and aspects of the illustrative embodiments of the present invention may be located and/or executed so as to achieve the operation, output, and external effects of the illustrative embodiments as described herein.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash basic input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306. The operating system coordinates and provides control of various components within the data processing system 300 in FIG. 3. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 300.

As a server, data processing system 300 may be, for example, an IBM eServer™ System p® computer system, Power™ processor based computer system, or the like, running the Advanced Interactive Executive (AIX®) operating system or the LINUX® operating system. Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for illustrative embodiments of the present invention may be performed by processing unit 306 using computer usable program code, which may be located in a memory such as, for example, main memory 308, ROM 324, or in one or more peripheral devices 326 and 330, for example.

A bus system, such as bus 338 or bus 340 as shown in FIG. 3, may be comprised of one or more buses. Of course, the bus system may be implemented using any type of communication fabric or architecture that provides for a transfer of data between different components or devices attached to the fabric or architecture. A communication unit, such as modem 322 or network adapter 312 of FIG. 3, may include one or more devices used to transmit and receive data. A memory may be, for example, main memory 308, ROM 324, or a cache such as found in NB/MCH 302 in FIG. 3.

As mentioned above, in some illustrative embodiments the mechanisms of the illustrative embodiments may be implemented as application specific hardware, firmware, or the like, application software stored in a storage device, such as HDD 326 and loaded into memory, such as main memory 308, for executed by one or more hardware processors, such as processing unit 306, or the like. As such, the computing device shown in FIG. 3 becomes specifically configured to implement the mechanisms of the illustrative embodiments and specifically configured to perform the operations and generate the outputs described hereafter with regard to the mechanism for improving performance of dispersed location-based deduplication with minimal impact on deduplication efficiency.

Those of ordinary skill in the art will appreciate that the hardware in FIGS. 2 and 3 may vary depending on the implementation. Other internal hardware or peripheral devices, such as flash memory, equivalent non-volatile memory, or optical disk drives and the like, may be used in addition to or in place of the hardware depicted in FIGS. 2 and 3. Also, the processes of the illustrative embodiments may be applied to a multiprocessor data processing system, other than the SMP system mentioned previously, without departing from the spirit and scope of the present invention.

Moreover, the data processing system 300 may take the form of any of a number of different data processing systems including client computing devices, server computing devices, a tablet computer, laptop computer, telephone or other communication device, a personal digital assistant (PDA), or the like. In some illustrative examples, data processing system 300 may be a portable computing device that is configured with flash memory to provide non-volatile memory for storing operating system files and/or user-generated data, for example. Essentially, data processing system 300 may be any known or later developed data processing system without architectural limitation.

Figure 4:
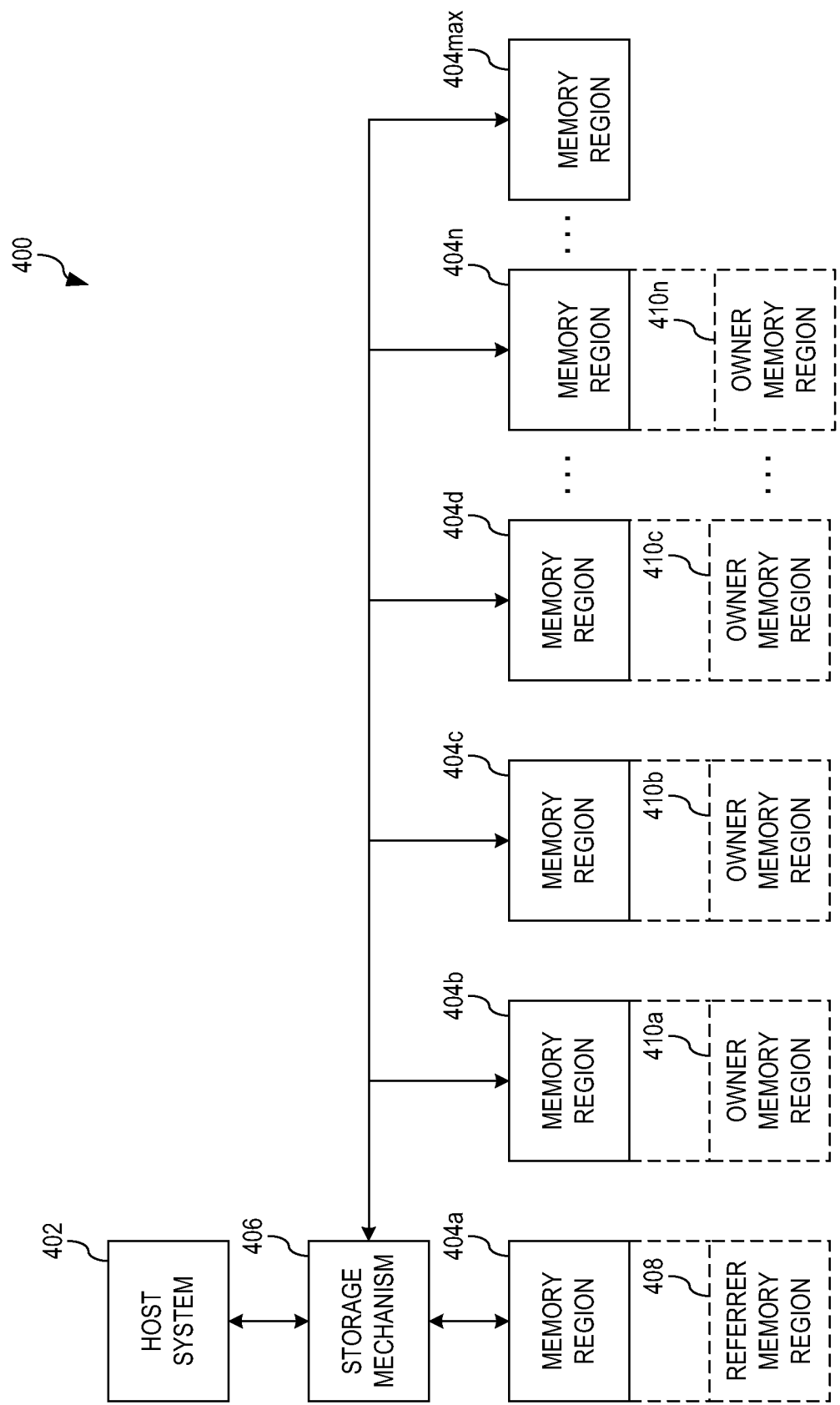
FIG. 4 depicts a functional block diagram of storage mechanisms that improve the performance of dispersed location-based deduplication with minimal impact on deduplication efficiency in accordance with an illustrative embodiment.

FIG. 4 depicts a functional block diagram of storage mechanisms that improve the performance of dispersed location-based deduplication with minimal impact on deduplication efficiency in accordance with an illustrative embodiment. As discussed previously, the storage mechanisms intelligently create duplication links between different referrer and owner memory regions by applying dynamic management logic on owner memory region selection within the referrer memory region. In accordance with the illustrative embodiments, a referrer region a memory regions to which the data is initially being written and has references to other memory regions that store data (i.e. owner regions) or to the referrer region itself as the referrer memory regions may also store data. In a first embodiment, storage mechanism 406 limits a number of owner memory regions that may be linked to a given referrer memory region (up to a predetermined number N owner memory regions) utilizing a "first come, first served" policy that allows data to be stored on the predetermined number N owner memory regions.

In this first embodiment, when host system 402 in data processing system 400 writes data to a memory region, storage mechanism 406 writes/stores the data, for example, in 8 KB data chunks. Thus, when host system 402 writes a 16 KB data file to a memory region, for example memory region 404a in memory regions 404a-404 max, the written-to memory becomes a referrer memory region 408 as is indicated by the dashed box. Storage mechanism 406 generates a hash value for each of the two 8 KB data chunks of the 16 KB data file and compares the hashed value for each 8 KB data chunk to hashed values for other stored data chunks referenced memory regions 404a-404 max. Storage mechanism 406 is a device that may reside in host 402, in one or more of memory regions 404a-404 max, or as a standalone mechanism. If referrer memory region 408 indicates that one or both matching data chunks already exist in referrer memory region 408 or one or more of owner memory regions 410a-410n, then rather than storing the 8 KB data chunks, storage mechanism 406 recognizes that later references to those data chunks will be identified by the hash value comparisons to referrer memory region 408 or one or more of owner memory regions 410a-410n. However, if the comparison to memory regions 404a-404 max indicates that one or neither of the data chunks fails to already exist in referrer memory region 408 and the associated owner memory regions 410a-410n, then storage mechanism 406 stores the non-existing data chunk in referrer memory region 408.

In the "first come, first served" policy, data chunks not previously stored are written to referrer memory region 408. However, each time data is accessed on referrer memory region 408 and/or the associated one or more of owner memory regions 410a-410n associated with referrer memory region 408, storage mechanism 406 loads those memory regions where the data exists. Thus, if a 64 KB data file has eight 8 KB data chunks stored on eight different owner memory regions, then storage mechanism 406 loads all eight different memory regions comprising the 8 KB chunks of the 64 KB data file. The problem would be more significant with a 256 KB data file were the 8 KB data chunks were stored across 32 different owner memory regions. Thus, in accordance with the illustrative embodiments, storage mechanism 406 stores the 8 KB data chunks on only a predetermined number N of owner memory regions. Thus, as data is stored in the dispersed manner, storage mechanism 406 keeps track of where data chunks are stored using a tracking mechanism such as data structure, list, table, or the like. Therefore, as data is stored on a particular owner memory region in the group of referrer memory region 408 and the associated owner memory regions 410a-410n, that particular memory region is added to the predetermined number N of owner memory regions. Once the number N of owner memory regions is reached, storage mechanism 406 utilizes only those owner memory regions in the predetermined number N of owner memory regions for future storage of data blocks.

In the event storage mechanism 406 writes or reads an 8 KB data chunk that exists on an owner memory region different from referrer memory region 408 and/or owner memory regions 410a-410n in the predetermined number N of owner memory regions, storage mechanism 406 recognizes that the owner memory regions is not one of the owner memory regions in the predetermined number N of owner memory regions. In this event, storage mechanism 406 writes the 8 KB data chunk to referrer memory region 408. While this may generate the duplicate 8 KB chunk within referrer memory region 408 and the associated owner memory regions 410a-410n, generating the duplicate 8 KB chunk reduces the overhead experienced by storage mechanism 406 by not loading more than the predetermined number N of owner memory regions. Thus, using the "first come, first served" policy, storage mechanism 406 reduces any overhead in memory or processing and does not depend of the user input/output size.

In a second embodiment, storage mechanism 406 utilizing a "popularity" policy that allows deduplication to be created based on a popularity of referrer memory region 408 and the associated owner memory regions 410a-410n identified by referrer memory region 408. Again, when host system 402 in data processing system 400 stores data in one or more of referrer memory region 408 and the associated owner memory regions 410a-410n, the data is stored, for example, in 8 KB data chunks. Thus, where host system 402 writes a 16 KB data file to referrer memory region 408, storage mechanism 406 generates a hash value for each of the two 8 KB data chunks of the 16 KB data file and compares the hashed value for each 8 KB data chunk to the hashed values for other stored data chunks referenced in memory regions 404a-404 max. If referrer memory region 408 indicates that one or both matching data chunks already exist in referrer memory region 408 or one or more of owner memory regions 410a-410n, then rather than storing the 8 KB data chunks, storage mechanism 406 recognizes that later references to those data chunks will be identified by the hash value comparisons to referrer memory region 408 or one or more of owner memory regions 410a-410n. However, if the comparison to memory regions 404a-404 max indicates that one or neither of the data chunks already exist in referrer memory region 408 or the associated owner memory regions 410a-410n, then storage mechanism 406 stores the non-existing data chunk in referrer memory region 408.

In the "popularity" policy, as data chunks are written as well as read from memory regions 404a-404 max, storage mechanism 406 tracks via a counter, data structure, or the like, the popularity of each owner memory region. When the value of the tracking indicates that a particular owner memory region is above a threshold, then the particular owner memory region is added to the predetermined number N of owner memory regions. Thus, the frequency of reads and writes to the owner memory regions in the predetermined number N of owner memory regions indicates that these owner regions should be the ones where new writes are directed. Again, each time data is accessed on referrer memory region 408 and/or on the associated owner memory regions 410a-410n, storage mechanism 406 has to load those owner memory regions where the data exists. Thus, in accordance with the illustrative embodiments, storage mechanism 406 identifies the most popular owner memory regions, adds those owner memory regions to the predetermined number N of owner memory regions, and utilizes those owner memory regions in the predetermined number N of owner memory regions for future storage of data blocks.

In the event storage mechanism 406 writes or reads an 8 KB data chunk that exists on an owner memory region different from referrer memory region 408 and/or owner memory regions 410a-410n in the predetermined number N of owner memory regions, storage mechanism 406 recognizes that the owner memory regions is not one of the owner memory regions in the predetermined number N of owner memory regions. In this event, storage mechanism 406 writes the 8 KB data chunk to referrer memory region 408. While this may generate the duplicate 8 KB chunk within referrer memory region 408 and the associated owner memory regions 410a-4104n, generating the duplicate 8 KB chunk reduces the overhead experienced by storage mechanism 406 by not loading more than the predetermined number N of owner memory regions. Thus, using the "popularity" policy, storage mechanism 406 reduces any overhead in memory or processing and does not depend of the user input/output size.

In yet a third embodiment, storage mechanism 406 utilizes a combination of both the "first come, first served" policy and the "popularity" policy. For example, storage mechanism 406 allows an owner memory region to be added to the predetermined number N of owner memory regions under the "first come, first served" policy. Then, using the threshold associated with the "popularity" policy other owner memory regions M may be added based on the owner region' popularity until a predetermined number N+M owner memory regions exists. However, if storage mechanism 406 is configured only to use the predetermined number N of owner memory regions, then, once the predetermined number N of owner memory regions under the "first come, first served" policy is reached, storage mechanism 406 may use the threshold associated with "popularity" policy to determine whether a (new) potential owner memory region is lucrative enough to be added as a replacement to an existing owner memory regions already in the predetermined number N of owner memory regions.

That is, to allow less popular owners to be replaced by more popular ones, storage mechanism 406 provides for unlinking less popular owner memory regions to clear out space for more popular or beneficial owner memory regions. This is particularly valuable when the number of owners is nearing or has already reached the predetermined number N of owner memory regions. Again, storage mechanism 406 maintains a tracking value, via a counter, data structure, or the like, of the popularity of each owner memory region regardless of whether the owner memory regions is part of the predetermined number N of owner memory regions or not.

Based on this information, and in case an owner memory regain that is not part of the predetermined number N of owner memory regions but is found to have a popularity value that is greater than an owner memory regions that is part of the predetermined number N of owner memory regions. If a more popular owner memory regions is identified, the least popular owner region in the predetermined number N of owner memory regions is removed and the more popular owner regions not currently in the predetermined number N of owner memory regions is added. It should be noted that the data blocks on the owner memory region that has been removed may have to be written to one of the owner memory regions in the predetermined number N of owner memory regions. That is, storage mechanism 406 may end up writing duplicate copies of the 8 KB data chunks that were on the removed owner memory region to one of the owner memory regions currently in the predetermined number N of owner memory regions. While this may generate the duplicate 8 KB chunk within referrer memory region 408 and the associated owner memory regions 410*a*-4104*n*, generating the duplicate 8 KB chunk reduces the overhead experienced by storage mechanism 406 by not loading more than the predetermined number N of owner memory regions. Thus, using a combination of a "first come, first served" policy and a "popularity" policy, storage mechanism 406 further reduces any overhead in memory or processing and does not depend of the user input/output size.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
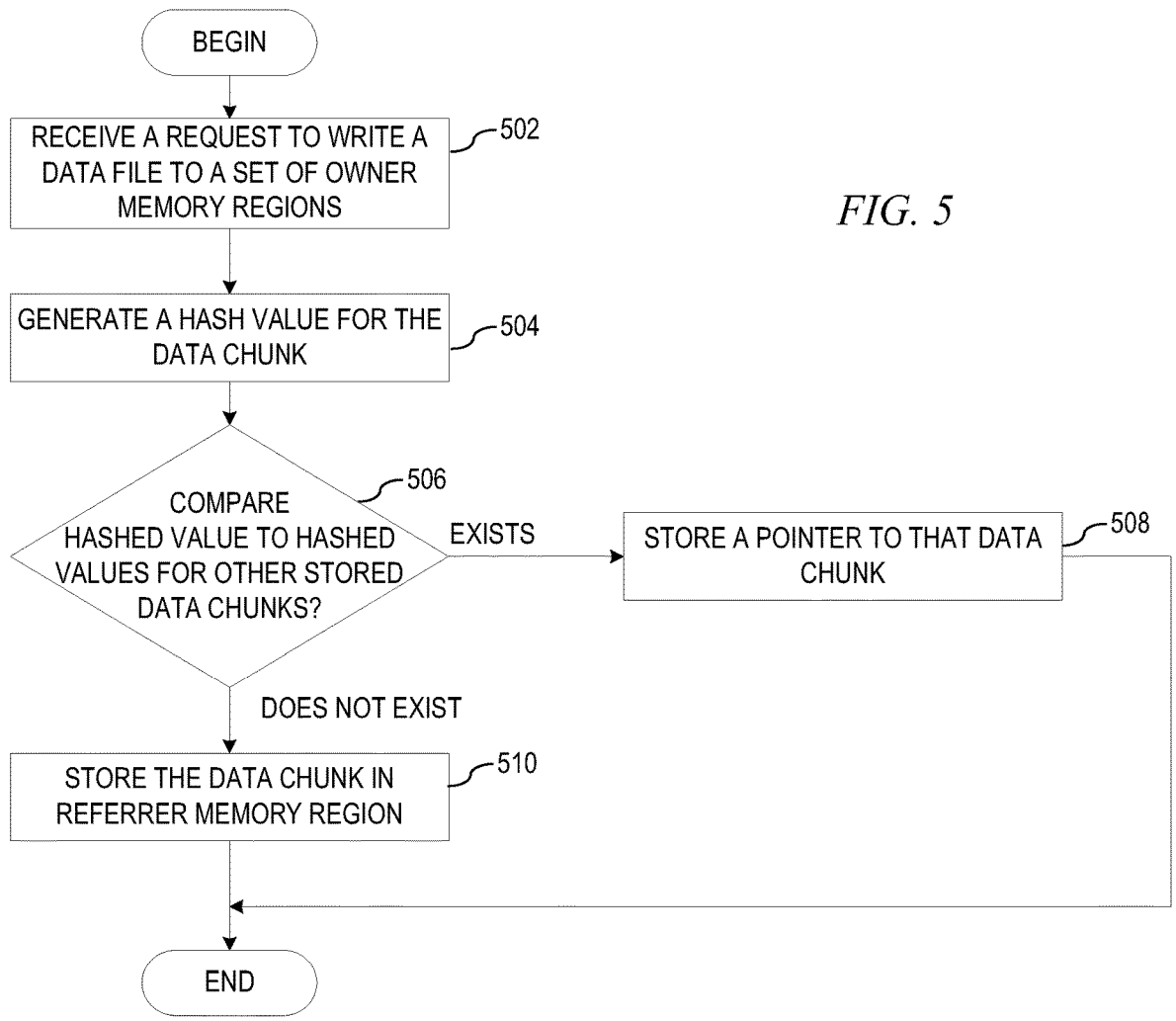
FIG. 5 depicts a flow diagram of the operations performed by a storage mechanism that improves the performance of dispersed location-based deduplication with minimal impact on deduplication efficiency in accordance with an illustrative embodiment.

FIG. 5 depicts a flow diagram of the operations performed by a storage mechanism that improves the performance of dispersed location-based deduplication with minimal impact on deduplication efficiency in accordance with an illustrative embodiment. As the operation begins, the storage mechanism receives a request to write a data file to a memory region within a set of memory regions (step 502). For each data chunk of the data file, the storage mechanism generates a hash value for the data chunk (step 504) and compares the hashed value to hashed values for other stored data chunks referenced in a the set of memory regions (step 506). If at step 506 the comparison indicates that the data chunk already exists in the referrer memory regions or one of the owner memory regions associated with the referrer memory region, the storage mechanism stores a pointer to that data chunk (step 508) with the operation terminating thereafter. If at step 506 the comparison indicates that the data chunk fails to exist in the written-to memory regions, i.e. the referrer memory regions or the associated one or more owner memory regions, the storage mechanism stores the data chunk in referrer memory region (step 510), with the operation terminating thereafter.

FIG. 6 depicts a flow diagram of the operations performed by a storage mechanism if deduplication is to be enforced amongst a subset of memory regions, i.e. the referrer memory regions and the associated one or more owner memory regions, in accordance with an illustrative embodiment. Before storing the data chunk of a data file in one a referrer region to which the data is written by the host system, the storage mechanism determines whether the data exists is in another memory region in the set of memory regions (step 602). If at step 602 the data fails to exist in another memory region in the set of memory regions, the storage mechanism stores the data in the referrer memory regions (step 604), with the operation terminating thereafter.

If at step 602 the data exists in another memory region in the set of memory regions, the storage controller determines whether a predetermined number N of owner memory regions has been met (step 606). If at step 606 the predetermined number N of owner memory regions has been met, then the storage mechanism stores the data chunk in the referrer memory region in the predetermined number N of owner memory regions (step 608), with the operation terminating thereafter. If at step 606 the predetermined number N of owner memory regions has not been met, the storage mechanism stores a reference to the data chunk in the referrer memory region (step 610). The storage mechanism may then add the memory region to the predetermined number N of owner memory regions depending on which policy the storage mechanism is currently operating under (step 612), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for improving performance of dispersed location-based deduplication with minimal impact on deduplication efficiency. By intelligently creating duplication links between different referrer and owner memory regions memory requirements are minimized for reading all the referred data with minimal impact on dedupe ratio, the amount of metadata regions for swapping are minimized with minimal impact on dedupe ratio, the amount of communication between the storage mechanism and the owner memory regions is minimized with minimal impact on dedupe ratio; and/or fine-grained control is provided over the dispersion of deduplication links over the metadata regions of the system.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, comprising:
configuring a referrer memory region, in a set of memory regions of a data storage system, to have a predetermined maximum number of corresponding owner memory regions in the set of memory regions, wherein
the referrer memory region stores a set of references to locations of data chunks of one or more data files stored in the corresponding owner memory regions, and
the predetermined maximum number limits a number of the corresponding owner memory regions to which the referrer memory region is permitted to have references in the set of references;
receiving, by the data storage system, a request to write a first data file to the referrer memory region;
generating, based on the receiving of the request, a hash value for each data chunk of the first data file;
comparing the generated hash value, of each data chunk of the first data file, to a set of hash values associated with a set of data chunks, of the data chunks, stored in a subset of owner memory regions associated with the referrer memory region;
determining, based on the comparison, that one or more data chunks of the first data file do not exist in the subset of owner memory regions; and
based on the determining, and for each data chunk of the one or more data chunks:
storing the data chunk in a specific owner memory region different from the subset of owner memory regions;
updating a popularity tracking metric for the specific owner memory region based on accessing of the specific owner memory region;
adding the specific owner memory region to the subset of owner memory regions based on a first policy and a second policy, wherein
the first policy adds the specific owner memory region to the subset of owner memory regions until the predetermined maximum number of corresponding owner memory regions is reached, and
the second policy adds the specific owner memory region to the subset of owner memory regions based on each of the updated popularity tracking metric of the specific owner memory region and a predetermined popularity criterion; and
storing a reference to the data chunk in the referrer memory region.

2. The method of claim 1, wherein the adding of the specific owner memory region to the subset of owner memory regions based on the second policy further comprises:
determining that a number of owner memory regions in the subset of owner memory regions has not reached the predetermined maximum number of corresponding owner memory regions;
determining, by the data storage system, whether the specific owner memory region has met a popularity threshold; and
based on the specific owner memory region meeting the popularity threshold, adding, by the data storage system, the specific owner memory region to the subset of owner memory regions.

3. The method of claim 1, wherein memory regions, from the set of memory regions that comprise the subset of owner memory regions, are added to the subset of owner memory regions up to the predetermined maximum number of corresponding owner memory regions based on a first come, first served policy.

4. The method of claim 3, wherein
under the first come, first served policy, the specific owner memory region is added to the subset of owner memory regions, as the data chunk is stored in the specific owner memory region, in a case where the addition of the specific owner memory region does not exceed the predetermined maximum number of corresponding owner memory regions, and
in a case where the addition of the specific owner memory region would exceed the predetermined maximum number of corresponding owner memory regions, the data chunk is written to the referrer memory region instead.

5. The method of claim 1, wherein
under the second policy, the specific owner memory region is added to the subset of owner memory regions based on a determination that the popularity metric of the specific owner memory region meets a predetermined popularity threshold, and
the popularity metric comprises a count of a number of reads and/or writes to the specific owner memory region.

6. The method of claim 1, wherein, under the second policy, a lowest popularity memory region is removed from the subset of owner memory regions when the popularity tracking metric of the specific owner memory region exceeds a popularity tracking metric of the lowest popularity memory region.

7. The method of claim 1, wherein the second policy is a popularity policy where first owner memory regions of the set of memory regions that are accessed more often than second owner memory regions of the set of memory regions are added to the subset of owner memory regions.

8. The method of claim 1, wherein the adding of the specific owner memory region comprises
replacing an existing owner memory region in the subset of owner memory regions with the specific owner memory region based on the predetermined maximum number of corresponding owner memory regions having been reached, and the predetermined popularity criterion being met by the popularity tracking metric of the specific owner memory region.

9. A computer program product, comprising a computer readable storage medium having a computer readable program stored therein, wherein the computer readable program, when executed on a computing device having a storage system, causes the storage system to:
configure a referrer memory region, in a set of memory regions of a data storage system, to have a predetermined maximum number of corresponding owner memory regions in the set of memory regions, wherein
the referrer memory region stores a set of references to locations of data chunks of one or more data files stored in the corresponding owner memory regions, and
the predetermined maximum number limits a number of the corresponding owner memory regions to which the referrer memory region is permitted to have references in the set of references;
receive, by the storage system, a request to write a first data file to the referrer memory region;
generate, based on the reception of the request, a hash value for each data chunk of the first data file;
compare the generated hash value, of each data chunk of the first data file, to a set of hash values associated with a set of data chunks of the data chunks stored in a subset of owner memory regions associated with the referrer memory region;
determine, based on the comparison, that one or more data chunks of the first data file do not exist in the subset of owner memory regions; and
based on the determination, and for each data chunk of the one or more data chunks:
store the data chunk in a specific owner memory region different from the subset of owner memory regions;
update a popularity tracking metric for the specific owner memory region based on accessing of the specific owner memory region;
add the specific owner memory region to the subset of owner memory regions based on a first policy and a second policy, wherein
the first policy adds the specific owner memory region to the subset of owner memory regions until the predetermined maximum number of corresponding owner memory regions is reached, and
the second policy adds the specific owner memory region to the subset of owner memory regions based on each of the updated popularity tracking metric of the specific owner memory region and a predetermined popularity criterion; and
store a reference to the data chunk in the referrer memory region.

10. The computer program product of claim 9, wherein the computer readable program further causes the storage system of the computing device to add the specific owner memory region to the subset of owner memory regions based on the second policy at least by:
a determination that a number of owner memory regions in the subset of owner memory regions has not reached the predetermined maximum number of corresponding owner memory regions;
a determination, by the storage system, whether the specific owner memory region has met a popularity threshold; and
based on the specific owner memory region meeting the popularity threshold, add the specific owner memory region to the subset of owner memory regions.

11. The computer program product of claim 9, wherein memory regions, from the set of memory regions that comprise the subset of owner memory regions, are added to the subset of owner memory regions up to the predetermined maximum number of corresponding owner memory regions based on a first come, first served policy.

12. The computer program product of claim 11, wherein under the first come, first served policy, the specific owner memory region is added to the subset of owner memory regions, as the data chunk is stored in the specific owner memory region, in a case where the addition of the specific owner memory region does not exceed the predetermined maximum number of corresponding owner memory regions, and
in a case where the addition of the specific owner memory region would exceed the predetermined maximum number of corresponding owner memory regions, the data chunk is written to the referrer memory region instead.

13. The computer program product of claim 9, wherein the second policy is a popularity policy where first owner memory regions, of the set of memory regions, that are accessed more often than second owner memory regions, of the set of memory regions, are added to the subset of owner memory regions.

14. The computer program product of claim 9, wherein the second policy is a popularity policy under which the specific owner memory region is added to the subset of owner memory regions based on a determination that the popularity metric of the specific owner memory region meets a predetermined popularity threshold, and
the popularity metric comprises a count of a number of reads and/or writes to the specific owner memory region.

15. The computer program product of claim 9, wherein the second policy is a popularity policy under which a lowest popularity memory region is removed from the subset of owner memory regions when the popularity tracking metric of the specific owner memory region exceeds a popularity tracking metric of the lowest popularity memory region.

16. An apparatus, comprising:
a processor;
a memory coupled to the processor; and
a storage system coupled to the processor, wherein the memory comprises instructions which, when executed by the processor, cause the storage system to:
configure a referrer memory region, in a set of memory regions of a data storage system, to have a predetermined maximum number of corresponding owner memory regions in the set of memory regions, wherein
the referrer memory region stores a set of references to locations of data chunks of one or more data files stored in the corresponding owner memory regions, and
the predetermined maximum number limits a number of the corresponding owner memory regions to which the referrer memory region is permitted to have references in the set of references;
receive, by the storage system, a request to write a first data file to the referrer memory region;
generate, based on the reception of the request, a hash value for each data chunk of the first data file;
compare the generated hash value, of each data chunk of the first data file, to a set of hash values associated with a set of data chunks of the data chunks stored in a subset of owner memory regions associated with the referrer memory region;

determine, based on the comparison, that one or more data chunks of the first data file do not exist in the subset of owner memory regions; and based on the determination, and for each data chunk of the one or more data chunks:

store the data chunk in a specific owner memory region different from the subset of owner memory regions;

update a popularity tracking metric for the specific owner memory region based on accessing of the specific owner memory region;

add the specific owner memory region to the subset of owner memory regions based on a first policy and a second policy, wherein the first policy adds the specific owner memory region to the subset of owner memory regions until the predetermined maximum number of corresponding owner memory regions is reached, and the second policy adds the specific owner memory region to the subset of owner memory regions based on each of the updated popularity tracking metric of the specific owner memory region and a predetermined popularity criterion; and store a reference to the data chunk in the referrer memory region.

17. The apparatus of claim 16, wherein the instructions further cause the storage system to add the specific owner memory region to the subset of owner memory regions based on the second policy at least by:

a determination that a number of owner memory regions in the subset of owner memory regions has not reached the predetermined maximum number of corresponding owner memory regions;

a determination whether the specific owner memory region has met a popularity threshold; and based on the specific owner memory region meeting the popularity threshold, add the specific owner memory region to the subset of owner memory regions.

18. The apparatus of claim 16, wherein memory regions, from the set of memory regions that comprise the subset of owner memory regions, are added to the subset of owner memory regions up to the predetermined maximum number of corresponding owner memory regions based on a first come, first served policy.

19. The apparatus of claim 18, wherein under the first come, first served policy, the specific owner memory region is added to the subset of owner memory regions as the data chunk is stored in the specific owner memory region, in a case where the addition of the specific owner memory region does not exceed the predetermined maximum number of corresponding owner memory regions, and in a case where the addition of the specific owner memory region would exceed the predetermined maximum number of corresponding owner memory regions, the data chunk is written to the referrer memory region instead.

20. The apparatus of claim 16, wherein the second policy is a popularity policy where first owner memory regions, of the set of memory regions, that are accessed more often than second owner memory regions, of the set of memory regions, are added to the subset of owner memory regions.

* * * * *